Patented Jan. 12, 1926.

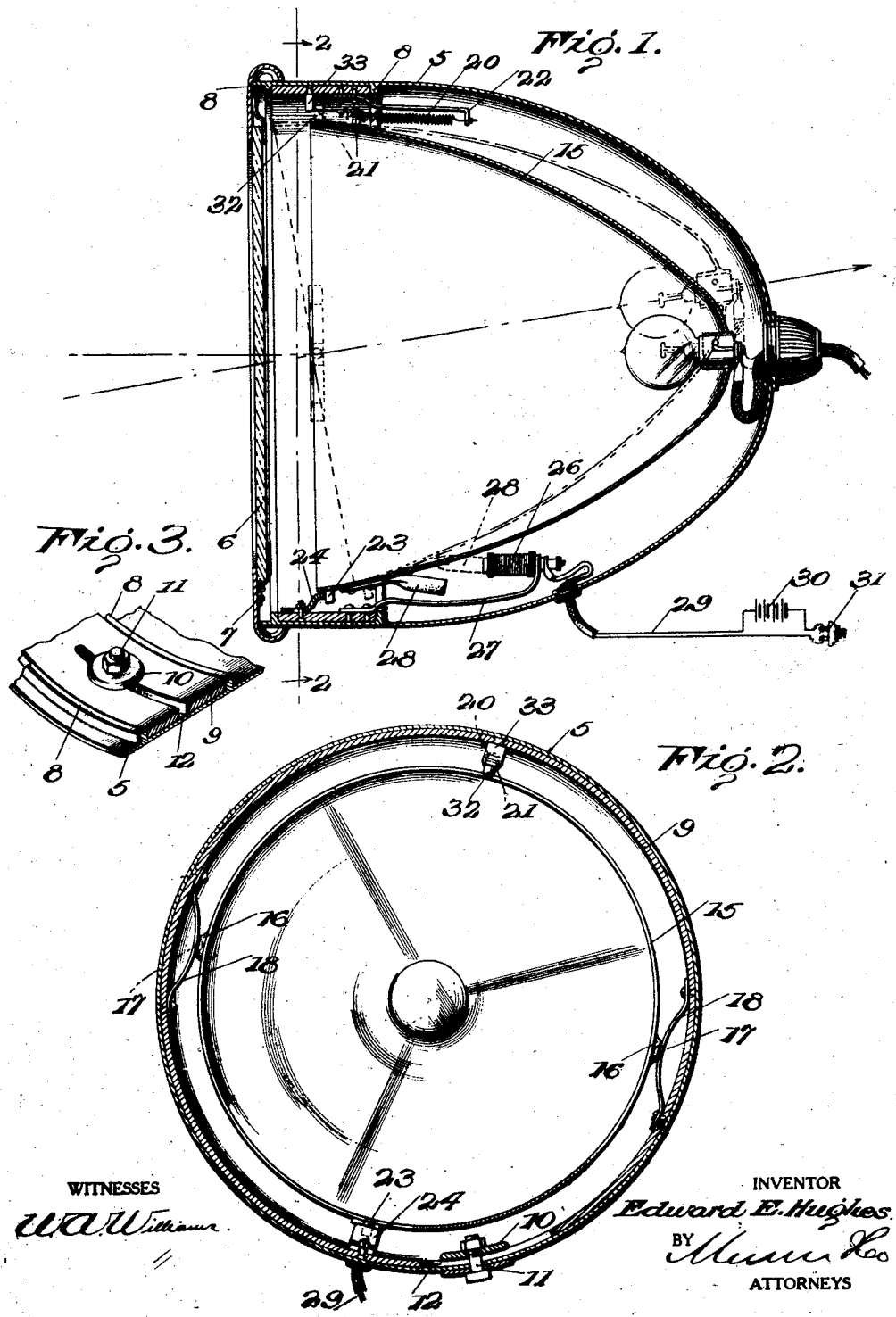

1,569,282

UNITED STATES PATENT OFFICE.

EDWARD EVERETT HUGHES, OF WALLACE, IDAHO.

HEADLIGHT.

Application filed November 1, 1924. Serial No. 747,359.

*To all whom it may concern:*

Be it known that I, EDWARD E. HUGHES, a citizen of the United States, residing at Wallace, in the county of Shoshone and State of Idaho, have invented certain new and useful Improvements in Headlights, of which the following is a specification.

This invention relates to headlights especially designed for use on automobiles and aims to provide a headlight of this character which is so constructed and organized as to afford the proper illumination necessary to enable the driver of the automobile to have a clear view of the road without subjecting the drivers of oncoming vehicles and others to a blinding glare.

A further object is the provision of a headlight of this character which is adjustable and controllable to meet varying conditions and which is of simple and durable construction, reliable in operation, easily and conveniently controlled and comparatively inexpensive to manufacture.

Other objects and advantages reside in certain novel features of the construction, arrangement and combination of parts which will be hereinafter more fully described and particularly pointed out in the appended claim, reference being had to the accompanying drawings forming a part of this specification, and in which:—

Figure 1 is a view in longitudinal section showing the preferred embodiment of the invention, parts being shown in elevation for the sake of simplicity of illustration, Figure 2 is a view in transverse section on the line 2—2 of Fig. 1, and Figure 3 is a fragmentary perspective view illustrating the means employed for holding the ring carrier in any angular adjustment.

Referring to the drawings the numeral 5 designates the casing of a headlight which may be of any conventional type. At the forward end of the headlight the usual light opening is provided from which the beam of light is projected, the lens 6 extending across this opening and being held in position by any conventional mounting 7. As shown in the drawings at least the forward end of the casing 5 is of cylindrical form and on and within this cylindrical portion of the casing spaced annular guides or guide rings 8 are mounted and suitably secured. For the sake of simplicity in illustration the rings 8 are shown integral with the casing, but as stated the rings are separate and are suitably secured in any approved manner to the casing. A ring carrier 9 is fitted in between the guide rings 8 and although held against longitudinal displacement by the guide rings is mounted for free rotary or angular adjustment. As shown in the drawings the ring carrier 9 is rotatable in a plane at right angles to the normal axis of the beam of light projected from the headlight which plane is also at right angles to the longitudinal axis of the headlight.

Means is provided for holding the ring carrier in adjusted angular position and preferably comprising a clamping member 10 engageable with the inner periphery of the ring carrier and a clamping nut and screw 11 co-operable with clamping member 10, the clamping screw 11 being accommodated in an arcuate slot 12 in the carrier 9. The arcuate slot 12 has an angular extent ample to take care of the maximum amount of angular adjustment of the ring carrier.

A reflector 15 is arranged within the casing 5 and is pivotally mounted on the ring carrier 9 so that the reflector is tiltable about the horizontal axis or about an axis inclined with respect to the horizontal, depending upon the adjustment of the ring carrier. Any suitable means may be employed for mounting the reflector 15 on the ring carrier but preferably bearing sockets 16 are provided at diametrically opposite points on the outsides of the reflector at the forward end thereof and in these sockets 16 bearing bosses 17 are fitted. The bearing bosses 17 are formed intermediate the ends of the yieldable brackets 18 and the ends of the brackets 18 are suitably secured to the ring carrier.

The reflector 15 is biased to normal position wherein its longitudinal axis coincides with the longitudinal axis of the casing 5 by means of a retractile coil spring 20 having one end secured, as at 21, to the upper portion of the forward end of the reflector and having its opposite end secured to a bracket 22 carried by and projecting rearwardly of the ring carrier 9. By mounting the bracket 22 on the ring carrier adjustment of the carrier does not vary the action of the spring. The movement of the reflector 15 under the influence of the spring 20 is limited by means of a stop 23 carried by the lower portion of the forward end of the reflector and co-operable with an abutment 24 mounted on the ring carrier 9. Obviously either the stop 23 or the abutment 24 may be made adjustable and if desired the stop 23 may be selectively threaded into any one of the series of sockets in the reflector.

Electro-magnetic means is provided for tilting the reflector or pivotally moving it and preferably this magnetic means includes an electro-magnet 26 mounted on a bracket 27 carried by the ring carrier 9. A soft iron armature 28 is fixed to the lower portion of the reflector 15 adjacent the forward end thereof and is disposed to co-act with the electro-magnet 26. The electro-magnet 26 has its coils included in a circuit 29 energized by a battery or other suitable source of current 30. A switch 31 is incorporated in the circuit 29 and serves to open or close this circuit whereby the electro-magnet 26 may be energized as desired. The switch 31 may be positioned convenient to the control of the driver of the vehicle.

Means is provided for limiting the movement of the reflector 15 under the influence of the electro-magnet 26, and this means preferably includes a stop pin 32 adjustably mounted on the upper portion of the reflector 15 adjacent its forward end and engageable with an abutment 33 mounted on the ring carrier. With this arrangement the ring carrier 9 may be adjusted angularly to bring the pivot bearings of the reflector from a horizontal position, to the inclined position shown in Fig. 2. The ring carrier may be releasably secured in any position. When the ring carrier is in an inclined position and the circuit 29 is closed by the switch 31 the electro-magnet 26 will be energized and will attract the armature 28 and consequently tilt the reflector 15 downwardly. This throws the beam of light downwardly and avoids subjecting the pedestrian, drivers of oncoming vehicles and others to the full blinding glare of the beam of light projected from the headlight. At the same time the full intensity of light is had. Moreover, when the reflector 15 is tilted with the carrier adjusted to bring the pivot bearings to the inclined dotted line position of Fig. 2, the beam of light is deflected laterally and either over to a position directly in front of the vehicle or to a position to one side of the vehicle, depending on the direction in which the ring carrier has been adjusted.

I claim:

In a headlight, a casing terminating at its forward end in a cylindrical portion, angular guides mounted within and secured to the cylindrical portion of the casing, a ring carrier fitted for rotary adjustment in between the guides, means for holding the ring carrier in adjusted position including a clamping device mounted on the casing and cooperable with the ring carrier, said ring carrier having a slot accommodating the clamping device, a reflector within the casing and pivotally mounted on the ring carrier, stop means mounted on the ring carrier for limiting the movements of the reflector and means for moving the reflector on its pivots.

EDWARD EVERETT HUGHES.